(12) United States Patent
Togashi

(10) Patent No.: US 7,646,586 B2
(45) Date of Patent: Jan. 12, 2010

(54) MULTILAYER CAPACITOR AND METHOD OF MANUFACTURING SAME

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 129 days.

(21) Appl. No.: 11/710,401

(22) Filed: Feb. 26, 2007

(65) Prior Publication Data

US 2007/0205514 A1 Sep. 6, 2007

(30) Foreign Application Priority Data

Mar. 1, 2006 (JP) ............................. P2006-055347

(51) Int. Cl.
*H01G 4/228* (2006.01)
*H01G 9/00* (2006.01)
(52) U.S. Cl. .................... 361/306.3; 361/309; 29/25.42
(58) Field of Classification Search ................. 361/303, 361/306.1, 306.3, 308.1, 309–310; 29/25.42
See application file for complete search history.

(56) References Cited

U.S. PATENT DOCUMENTS

| 6,243,252 | B1 * | 6/2001 | Kuroiwa et al. ............. 361/303 |
| 6,344,963 | B1 * | 2/2002 | Mori ........................ 361/306.3 |
| 6,373,683 | B1 * | 4/2002 | Higuchi et al. .............. 361/305 |
| 6,493,207 | B2 * | 12/2002 | Nakano et al. ........... 361/306.3 |
| 7,145,429 | B1 * | 12/2006 | Togashi et al. .............. 336/200 |
| 7,408,763 | B2 * | 8/2008 | Roy ........................... 361/303 |
| 2006/0234022 | A1 * | 10/2006 | Liu et al. .................... 428/210 |

FOREIGN PATENT DOCUMENTS

| JP | 02017619 A * | 1/1990 |
| JP | A 05-283283 | 10/1993 |
| JP | A-10-303066 | 11/1998 |
| JP | A-2004-259735 | 9/2004 |
| JP | A-2004-259736 | 9/2004 |
| JP | A-2004-259820 | 9/2004 |
| JP | A-2005-051226 | 2/2005 |
| JP | A-2005-108986 | 4/2005 |
| JP | A-2006-49753 | 2/2006 |
| KR | 2000-0072338 | 12/2000 |

* cited by examiner

*Primary Examiner*—Eric Thomas
(74) *Attorney, Agent, or Firm*—Oliff & Berridge, PLC

(57) ABSTRACT

A multilayer capacitor comprises a multilayer body in which a plurality of dielectric layers and a plurality of first and second inner electrodes are laminated alternately, and first and second terminal electrodes arranged on the multilayer body. The first terminal electrode is electrically connected to the first inner electrodes. The first terminal electrode includes one or a plurality of resistance layers having a resistivity greater than that of the first inner electrode. The one or a plurality of resistance layers cover end portions of lead portions of the first inner electrodes exposed at the side face. Each resistance layer has a width wider than the lead portion of the first inner electrode but narrower than the width of the side face formed with the first terminal electrode.

12 Claims, 13 Drawing Sheets

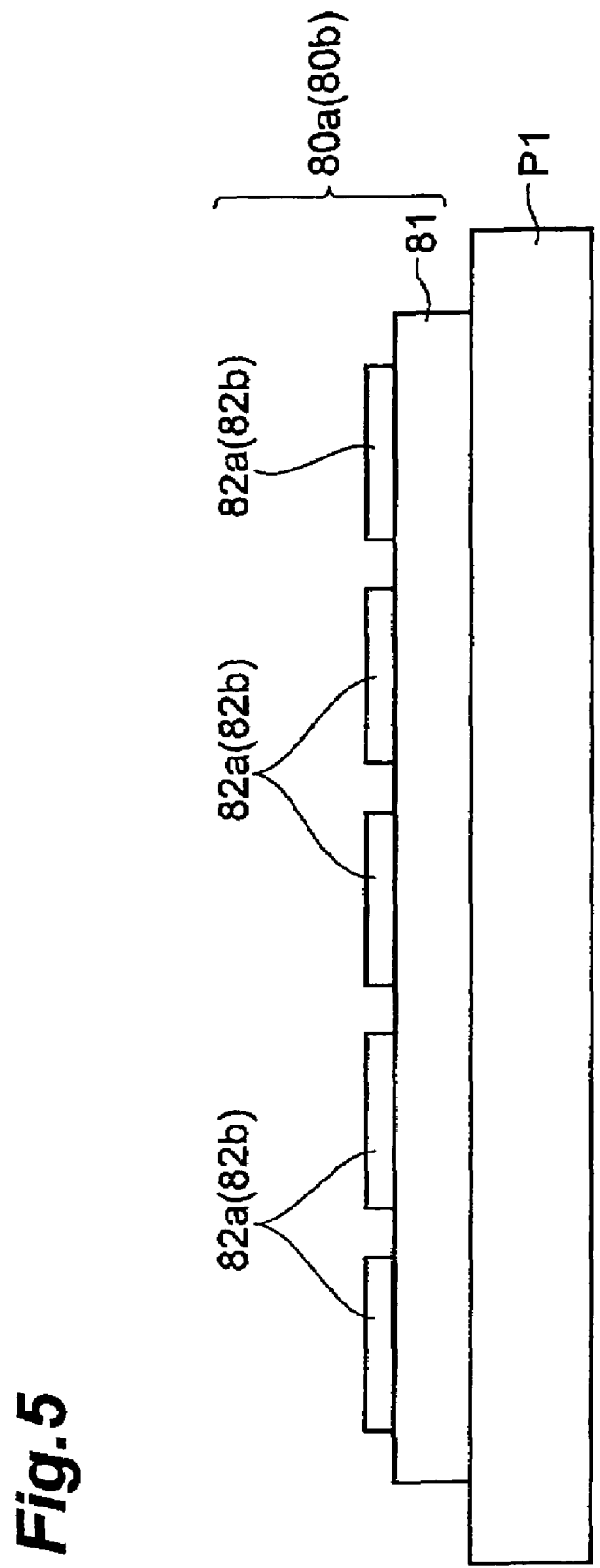

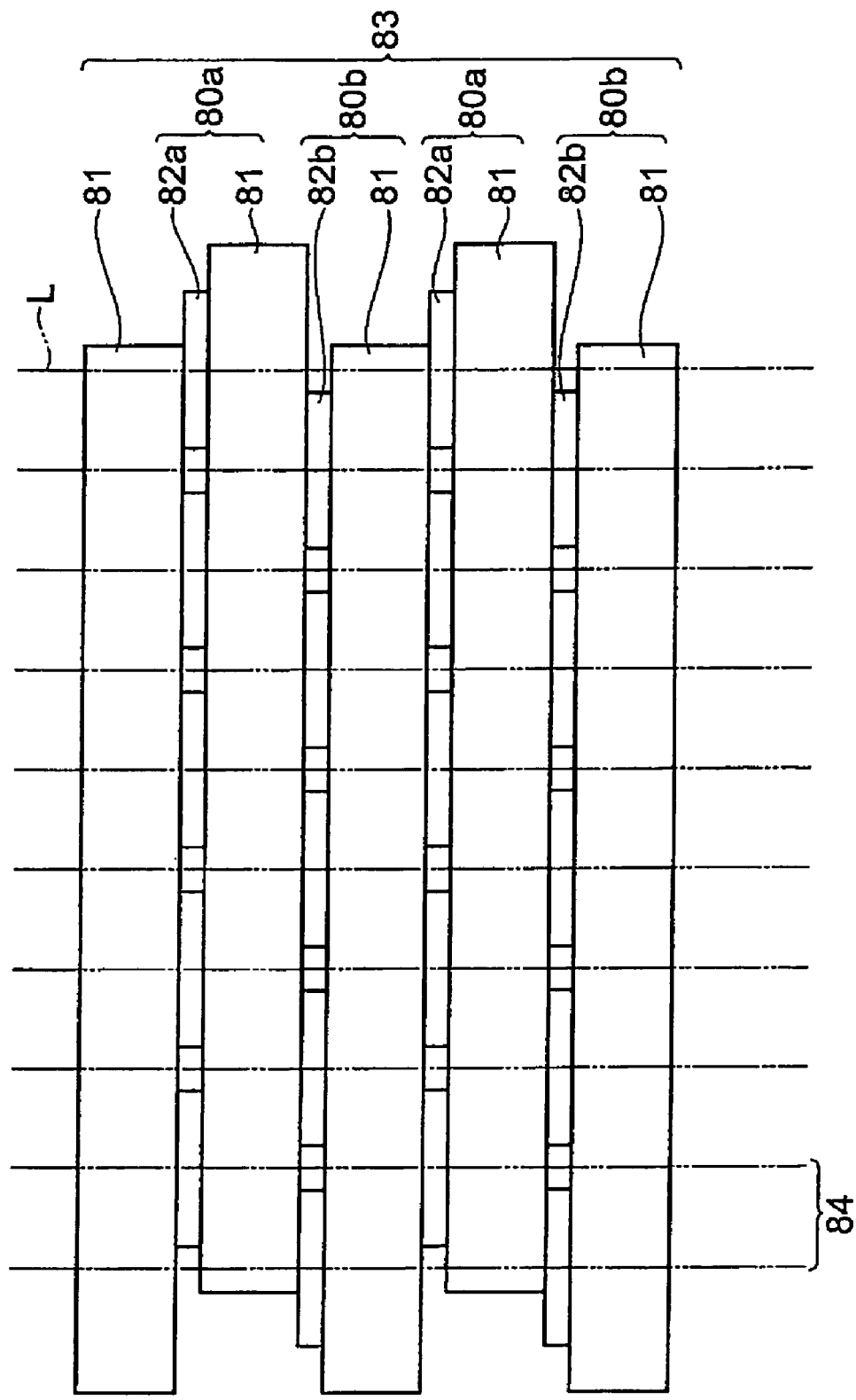

MULTILAYER CAPACITOR AND METHOD OF MANUFACTURING SAME

BACKGROUND OF THE INVENTION

1. Field of the Invention

The present invention relates to a multilayer capacitor and a method of manufacturing the same.

2. Related Background Art

Known as this kind of multilayer capacitor is one comprising a multilayer body in which a plurality of dielectric layers and a plurality of inner electrodes are laminated alternately, and a plurality of terminal electrodes formed on the multilayer body.

Power supplies for central processing units (CPUs) mounted in digital electronic devices have been lowering their voltage while increasing their load current. This has made it very difficult for fluctuations in power voltage to be held within a tolerable range against abrupt changes in load current, whereby a multilayer capacitor known as decoupling capacitor has been connected to the power supplies. When the load current fluctuates transiently, the multilayer capacitor supplies a current to the CPU, thereby suppressing the fluctuation in power voltage.

Recently, as the CPUs have further been increasing their frequency, their load current has been becoming faster and greater. Therefore, the multilayer capacitors employed in decoupling capacitors have been demanded to increase their capacity and equivalent series resistance (ESR). There have been studies for incorporating a resistance layer having a low resistivity in the terminal electrodes, so as to increase the equivalent series resistance in conventional multilayer capacitors.

SUMMARY OF THE INVENTION

It is an object of the present invention to provide a multilayer capacitor which can regulate the equivalent series resistance easily and accurately, and a method of manufacturing the same.

The inventors diligently studied multilayer capacitors which can regulate the equivalent series resistance and, as a result, have found a fact that the equivalent series resistance can be regulated when the thickness of a resistance layer included in a terminal electrode is adjusted. Further studies about this fact have newly revealed a problem that the thickness of the resistance layer is hard to adjust accurately when the resistance layer is formed so as to cover the whole region of a side face of the multilayer body.

Therefore, the inventors have given thought to a multilayer capacitor which narrows the resistance layer to a width which is necessary and sufficient for guaranteeing a function as the resistance layer, so as to adjust the thickness of the resistance layer accurately, thereby making it possible to regulate the equivalent series resistance easily and accurately.

In view of such studies, in one aspect, the present invention provides a multilayer capacitor comprising a multilayer body in which a plurality of dielectric layers and a plurality of inner electrodes are laminated alternately, and first and second terminal electrodes arranged on a side face of the multilayer body; wherein the plurality of inner electrodes include a plurality of first and second inner electrodes laminated alternately; wherein each of the first inner electrodes includes a first capacitance forming portion, and a lead portion extending from the first capacitance forming portion so as to expose an end portion at the side face arranged with the first terminal electrode and electrically connect with the first terminal electrode and having a first width; wherein each of the second inner electrodes includes a second capacitance forming portion opposing the first capacitance forming portion with a dielectric layer in between in a laminating direction, and a lead portion extending from the second capacitance forming portion so as to expose an end portion at the side face arranged with the second terminal electrode and electrically connect with the second terminal electrode; wherein the first terminal electrode includes a resistance layer having a resistivity greater than that of the first inner electrode; and wherein the resistance layer has a second width narrower than the width of the side face arranged with the first terminal electrode but wider than the first width and continuously covers all the end portions of the lead portions exposed at the side face of the multilayer body.

The first terminal electrode of the multilayer capacitor includes a resistance layer having a resistivity greater than that of the first inner electrode. The resistance layer is wider than the lead portion of the first inner electrode, and completely covers the end portion of the lead portion included in the first inner electrode. Therefore, the first inner electrode is electrically connected to the resistance layer, whereby the multilayer capacitor can increase the equivalent series resistance. The width (second width) of the resistance layer of the first terminal electrode is narrower than the width of the side face arranged with the first terminal electrode. Therefore, this multilayer capacitor can decrease the area of the resistance layer as compared with a multilayer capacitor equipped with a terminal electrode including a resistance layer covering the whole area of the side face of the multilayer body. Consequently, this multilayer capacitor can easily restrain the thickness of the resistance layer from fluctuating, and can regulate the equivalent series resistance easily and accurately. Accurately regulating the equivalent series resistance improves the yield of the multilayer capacitor as well.

In another aspect, the present invention provides a multilayer capacitor comprising a multilayer body in which a plurality of dielectric layers and a plurality of inner electrodes are laminated alternately, and first and second terminal electrodes arranged on a side face of the multilayer body; wherein the plurality of inner electrodes include a plurality of first and second inner electrodes laminated alternately; wherein each of the first inner electrodes includes a first capacitance forming portion, and a plurality of lead portions each having a first width; wherein each of the lead portions included in each of the first inner electrodes extends from the first capacitance forming portion so as to expose an end portion at the side face arranged with the first terminal electrode and electrically connect with the first terminal electrode; wherein the plurality of lead portions included in each of the first inner electrodes are arranged so as to substantially overlap with the plurality of lead portions included in another first inner electrode in a laminating direction and form a plurality of sets of lead portions along the laminating direction; wherein each of the second inner electrodes includes a second capacitance forming portion opposing the first capacitance forming portion with a dielectric layer in between in the laminating direction, and a lead portion extending from the second capacitance forming portion to the side face arranged with the second terminal electrode and electrically connecting with the second terminal electrode; wherein the first terminal electrode includes a plurality of resistance layers having a resistivity greater than that of the first inner electrode; wherein the sum of widths of the plurality of resistance layers is smaller than the width of the side face arranged with the first terminal electrode; and wherein each of the resistance layers has a second width wider than the first width, corresponds to the sets of the lead portions of the plurality of first inner electrodes along the laminating direction, and continuously covers all the end portions of the lead portions included in each of the sets.

The first terminal electrode of the multilayer capacitor includes a plurality of resistance layers each having a resistivity greater than that of the first inner electrode. Each resistance layer is wider than each lead portion of the first inner electrode and covers all the end portions of the lead portions of the first inner electrode corresponding to the resistance layer. Therefore, the first inner electrode is electrically connected to the resistance layer, whereby the multilayer capacitor can increase the equivalent series resistance. The sum of widths (second widths) of the plurality of resistance layers in the first terminal electrode is smaller than the width of the side face arranged with the first terminal electrode. Therefore, this multilayer capacitor can decrease the area of the resistance layers as compared with a multilayer capacitor equipped with a terminal electrode including a resistance layer covering the whole area of the side face of the multilayer body. Consequently, this multilayer capacitor can easily restrain the thickness of the resistance layers from fluctuating, and can regulate the equivalent series resistance easily and accurately. Accurately regulating the equivalent series resistance improves the yield of the multilayer capacitor as well. The first inner electrode includes a plurality of lead portions, whereas the first terminal electrode includes a plurality of resistance layers corresponding to these lead portions. Therefore, the respective resistance components of the resistance layers are connected in parallel in the first terminal electrode, which makes it possible to restrain fluctuations from affecting a desirable resistance layer thickness.

Preferably, the first capacitance forming portion included in each first inner electrode has a third width wider than the first width of the lead portion included in the first inner electrode. This makes it possible to narrow the width (first width) of the lead portions while keeping a large capacitance by widening the third width. Therefore, the width of the resistance layers can be narrowed while increasing the capacitance. In this case, it will be preferred if the second width is narrower than the third width. Narrowing the width of the resistance layers can regulate the equivalent series resistance more accurately.

Preferably, the first terminal electrode further includes a foundation layer arranged on the side face exposing the end portions of the lead portions of the first inner electrodes and under the resistance layer, a conductor layer arranged on the resistance layer, and a plating layer arranged on the conductor layer, wherein the foundation layer has a width narrower than the second width and continuously covers all the end portions of the lead portions continuously covered with the resistance layer arranged on the foundation layer, wherein the resistance layer is arranged so as to cover the whole area of the foundation layer, and wherein each of the resistivity of the foundation layer and resistivity of the plating layer is smaller than the resistivity of the resistance layer. When the first terminal electrode includes a foundation layer, the junction between the lead portion of the first inner electrode and the first terminal electrode improves. When the first terminal electrode includes a plating layer, the durability of the first terminal electrode improves, and the solderability between the first terminal electrode and a substrate or the like can be ameliorated. When the first terminal electrode includes a conductor layer, the junction between the resistance layer and plating layer improves.

Preferably, the multilayer body has a substantially rectangular parallelepiped form, while each of the side face arranged with the first terminal electrode and the side face arranged with the second terminal electrode is a side face extending longitudinally of the multilayer body. This shortens the path of a current flowing through the first and second inner electrodes, and thus can lower the equivalent series inductance of the multilayer capacitor.

In still another aspect, the present invention provides a method of manufacturing a multilayer capacitor, the method comprising the steps of preparing a multilayer body in which a plurality of first inner electrodes each including a first capacitance forming portion and a lead portion extending from the first capacitance forming portion so as to expose an end portion at a side face and a plurality of second inner electrodes each including a second capacitance forming portion and a lead portion extending from the second capacitance forming portion to a side face are alternately laminated with a dielectric layer interposed therebetween; printing a foundation conductor paste in a region continuously covering all the end portions of the lead portions included in the plurality of first inner electrodes on a side face exposing the end portions of the lead portions, so as to form a foundation layer of a first terminal electrode having a width wider than the end portion of each of the lead portions of the first inner electrodes but narrower than the side face arranged with the first terminal electrode; and printing a high-resistance conductor paste having a resistivity greater than that of the first inner electrode and that of the foundation conductor paste on the foundation layer of the first terminal electrode so as to cover the whole area of the foundation layer and form a resistance layer of the first terminal electrode having a width wider than the end portion of each of the lead portions of the first inner electrodes but narrower than the side face arranged with the first terminal electrode.

In this method, the foundation and resistance layers of the first terminal electrode are formed by printing. This can favorably restrain the thickness of the resistance layer from fluctuating. In thus manufactured multilayer capacitor, the first terminal electrode includes a resistance layer having a resistivity greater than that of the first inner electrodes and that of the foundation layer, whereas this resistance layer covers all the end portions of the first inner electrodes exposed at one or more side faces. Therefore, these inner electrodes are electrically connected to the resistance layer, whereby the equivalent series resistance of the multilayer capacitor can be increased. The foundation and resistance layers of the first terminal electrode are narrower than the side face arranged with the first terminal electrode. Therefore, as compared with a multilayer capacitor in which a resistance layer is formed on the whole area of the side face arranged with the first terminal electrode, the resistance layer has a smaller area and thus can easily suppress fluctuations in its thickness. As a result, the equivalent series resistance can be regulated easily and accurately. Regulating the equivalent series resistance accurately improves the yield of the multilayer capacitor as well.

The present invention can provide a multilayer capacitor which can regulate the equivalent series resistance easily and accurately, and a method of manufacturing the same.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is a sectional view for explaining a manufacturing step of the multilayer body included in the multilayer capacitor in accordance with the first embodiment;

FIG. 6 is a sectional view for explaining a manufacturing step of the multilayer body included in the multilayer capacitor in accordance with the first embodiment;

DESCRIPTION OF THE PREFERRED EMBODIMENTS

In the following, preferred embodiments of the present invention will be explained in detail with reference to the accompanying drawings. In the explanation, constituents identical to each other or those having functions identical to each other will be referred to with numerals identical to each other without repeating their overlapping descriptions.

First Embodiment

Figure 1:
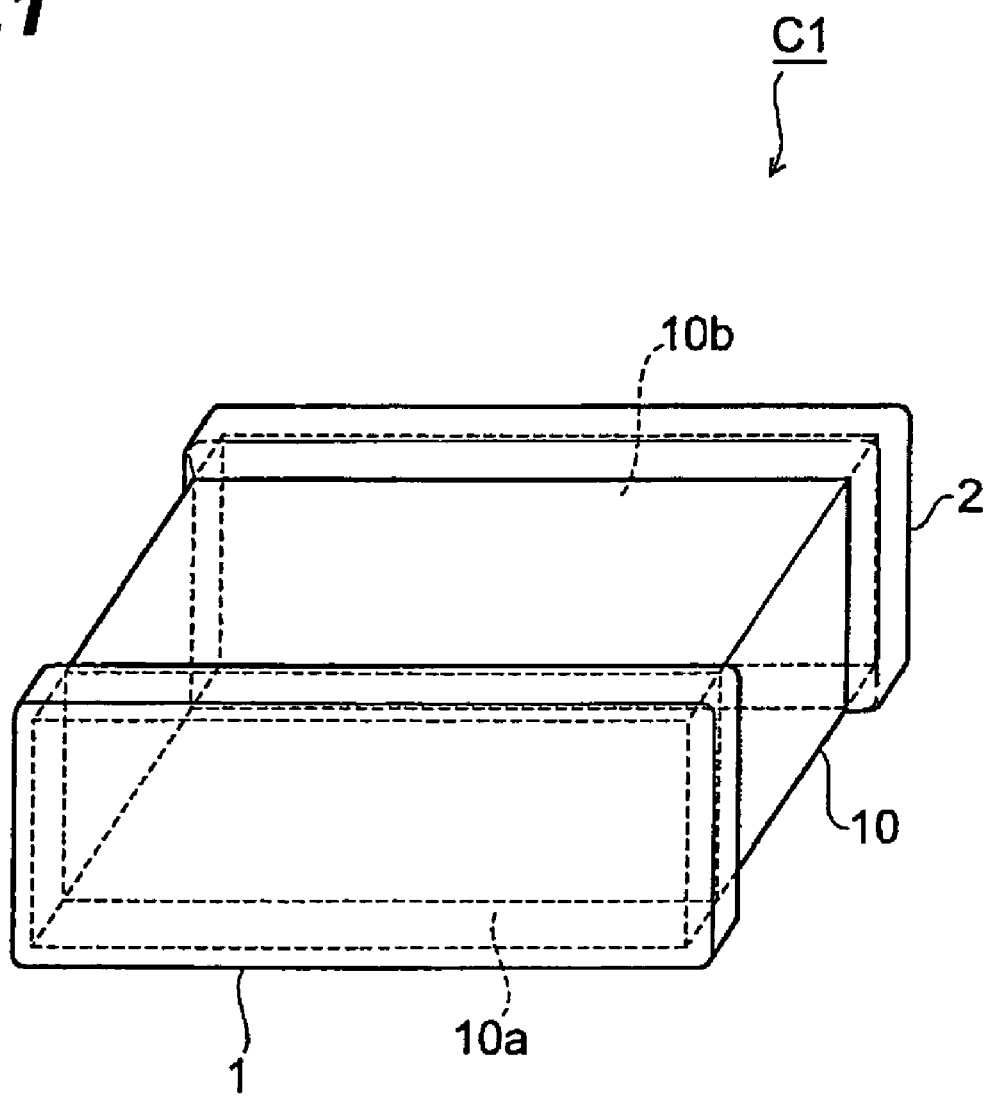
FIG. 1 is a perspective view of a multilayer capacitor in accordance with a first embodiment.
Figure 2:
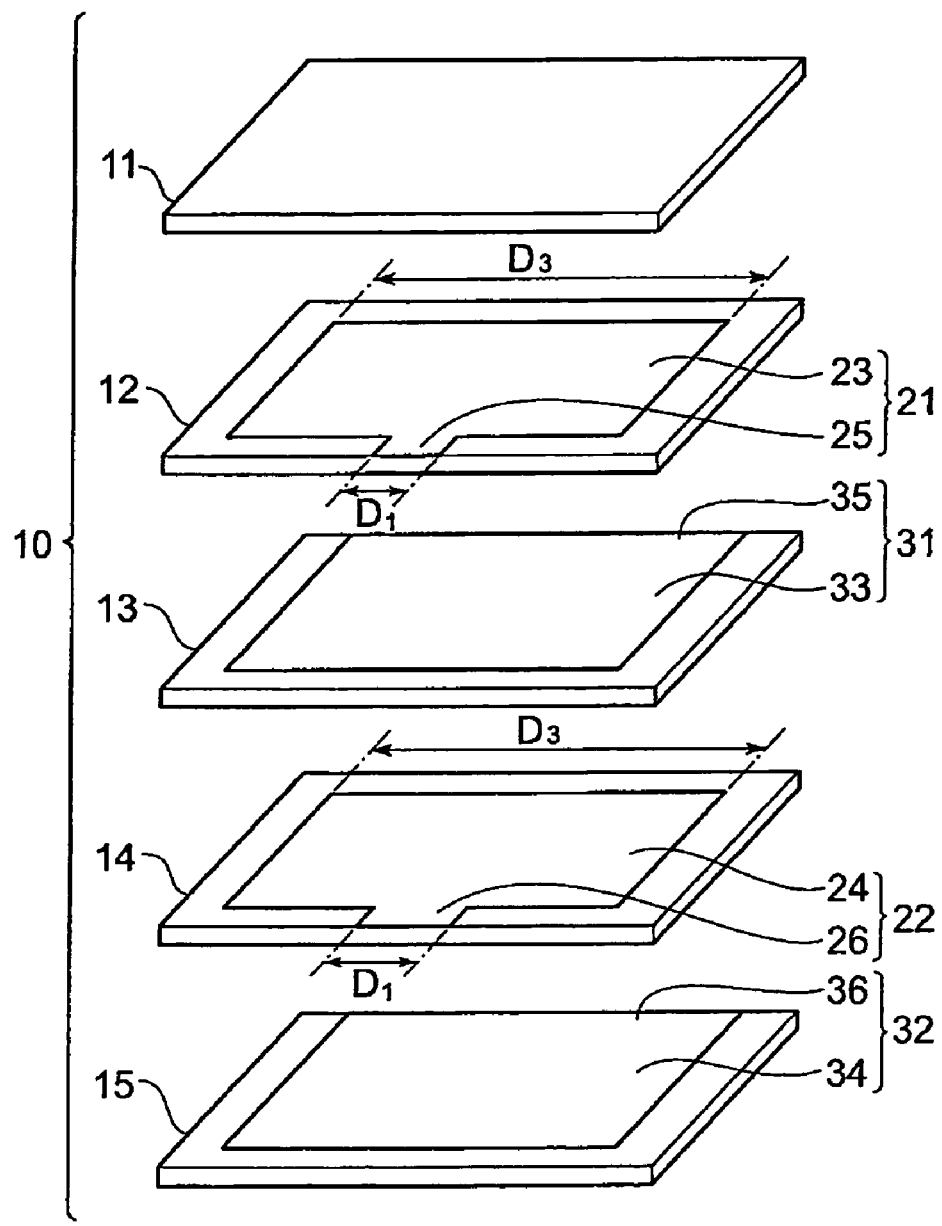
FIG. 2 is an exploded perspective view of the multilayer body included in the multilayer capacitor in accordance with the first embodiment.
Figure 4:
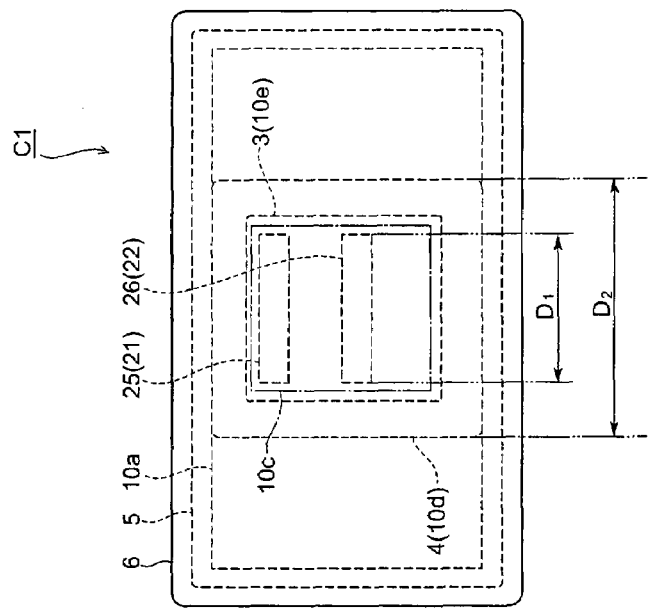
FIG. 4 is a view for explaining the structure of a terminal electrode in the multilayer capacitor in accordance with the first embodiment.
Figure 3:
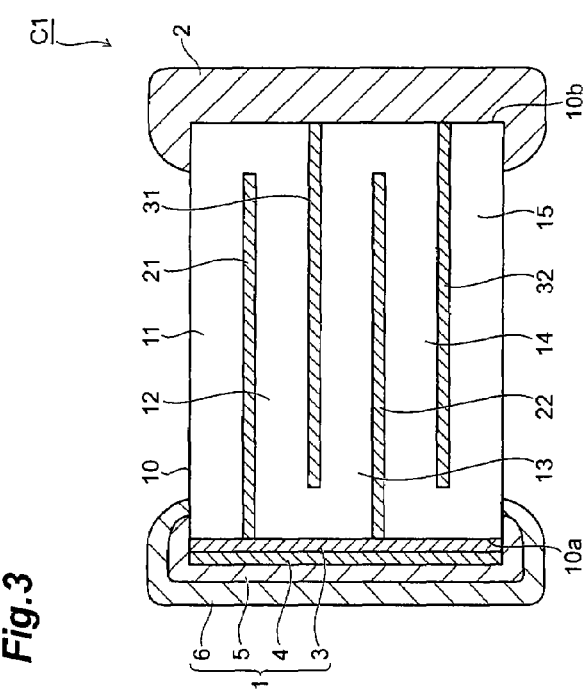
FIG. 3 is a sectional view of the multilayer capacitor in accordance with the first embodiment.

With reference to FIGS. 1 to 4, a multilayer capacitor C1 in accordance with a first embodiment will be explained. FIG. 1 is a perspective view of the multilayer capacitor in accordance with the first embodiment. FIG. 2 is an exploded perspective view of the multilayer body included in the multilayer capacitor in accordance with the first embodiment. FIG. 3 is a sectional view of the multilayer capacitor in accordance with the first embodiment FIG. 4 is a view for explaining the structure of a terminal electrode of the multilayer capacitor in accordance with the first embodiment.

As shown in FIG. 1, the multilayer capacitor C1 comprises a rectangular parallelepiped multilayer body 10, and first and second terminal electrodes 1, 2 formed on the multilayer body 10.

The first terminal electrode 1 is positioned on a side face 10a extending longitudinally of the multilayer body 10. The second terminal electrode 2 is positioned on a side face 10b extending longitudinally of the multilayer body 10 and opposing the side face 10a. The first terminal electrode 1 and second terminal electrode 2 are electrically insulated from each other.

As shown in FIG. 2, in the multilayer body 10, a plurality of (5 in this embodiment) dielectric layers 11 to 15 and a plurality of (2 each in this embodiment) first and second inner electrodes 21, 22, 31, 32 are laminated alternately in the multilayer body 10. The actual multilayer capacitor C1 is integrated to such an extent that no boundaries are discernible among the dielectric layers 11 to 15. The first and second inner electrodes 21, 22, 31, 32 are mainly composed of nickel, for example.

The first inner electrodes 21, 22 include capacitance forming portions 23, 24 corresponding to first capacitance forming portions and lead portions 25, 26. Each of the capacitance forming portions 23, 24 has a rectangular form. The capacitance forming portions 23, 24 are arranged at respective positions separated from all the side faces parallel to the laminating direction of the dielectric layers 11 to 15 in the multilayer body 10 (hereinafter simply referred to as "laminating direction") by a predetermined distance, i.e., by such a distance as to be sufficiently kept from being exposed at any of the side faces parallel to the laminating direction. The capacitance forming portions 23, 24 are arranged so as to be substantially overlaid on each other when seen in the laminating direction.

The lead portions 25, 26 extend from near the center of the respective end portions (sides) of their corresponding capacitance forming portions 23, 24 facing the side face 10a of the multilayer body 10 to the side face 10a so as to expose end portions at the side face 10a The lead portions 25, 26 are connected to the first terminal electrode 1 by their end portions exposed at the side face 10a. The lead portions 25, 26 are arranged so as to be substantially overlaid on each other when seen in the laminating direction.

Each of the lead portions 25, 26 of the first inner electrodes 21, 22 has a first width $D_1$. Each of the capacitance forming portions 23, 24 of the first inner electrodes 21, 22 has a third width $D_3$. A resist layer of the first terminal electrode 1 which will be explained later has a second width $D_2$.

The first width $D_1$ refers to the width of each of the lead portions 25, 26 in a direction along the side face 10a of the multilayer body 10 arranged with the first terminal electrode 1. The third width $D_3$ refers to the width of each of the capacitance forming portions 23, 24 in the direction along the side face 10a of the multilayer body 10 arranged with the first terminal electrode 1. The first width $D_1$ of the lead portions 25, 26 is smaller than the third width $D_3$ of the capacitance forming portions 23, 24.

The second inner electrodes 31, 32 include capacitance forming portions 33, 34 corresponding to second capacitance forming portions and lead portions 35, 36. Each of the capacitance forming portions 33, 34 has a rectangular form. The capacitance forming portions 33, 34 are arranged at respective positions separated from side faces parallel to the laminating direction of the multilayer body 10 by a predetermined distance, i.e., by such a distance as to be sufficiently kept from being exposed at the side faces parallel to the laminating direction. The capacitance forming portions 33, 34 are arranged so as to be substantially overlaid on each other when seen in the laminating direction.

The capacitance forming portions 23, 24 of the first inner electrodes 21, 22 are arranged so as to oppose the capacitance forming portions 33, 34 of the second inner electrodes 31, 32 with the respective dielectric layers 12 to 14 in between in the laminating direction of the multilayer body 10.

The lead portions 35, 36 are arranged so as to extend straight from the capacitance forming portions 33, 34 to the same side face 10b of the multilayer body 10 and expose end portions at the side face 10b. The lead portions 35, 36 are connected to the second terminal electrode 2 by their end portions exposed at the side face 10b. The width of each of the lead portions 35, 36 in the direction along the side face 10b is identical to that of each of the capacitance forming portions 33, 34 in the direction along the side face 10b.

As shown in FIG. 3, the first terminal electrode 1 includes a foundation layer 3, a resistance layer 4, a conductor layer 5, and a plating layer 6. The foundation layer 3 is formed on the side face 10a of the multilayer body 10 and under the resistance layer 4. The resistance layer 4 is formed on the foundation layer 3. The conductor layer 5 is formed on the resistance layer 4. The plating layer 6 is formed on the conductor layer 5. In FIG. 3, the regions corresponding to the dielectric layers 11 to 15 are not hatched.

FIG. 4 is a view showing the multilayer capacitor C1 as seen from the side face 10a of the multilayer body 10 for explaining the structure of the first terminal electrode 1. As shown in FIG. 4, the foundation layer 3 continuously covers all the end portions of the lead portions 25, 26 exposed at the side face 10a of the multilayer body 10 on the side face 10a. The foundation layer 3 has a width wider than the first width $D_1$ but narrower than the width of the side face 10a of the multilayer body 10. More specifically, the width of the foundation layer 3 is narrower than the third width $D_3$. Namely, the foundation layer 3 is wider than each of the lead portions 25, 26 of the first inner electrodes 21, 22 but narrower than the side face 10a arranged with the first terminal electrode 1, more specifically narrower than each of the capacitance forming portions 23, 24. Here, the width of the foundation layer 3 refers to the one in the direction along the side face 10a of the multilayer body 10 when the first terminal electrode 1 is seen along the laminating direction of the multilayer body 10. The width of the side face 10a refers to the one when the side face 10a arranged with the first terminal electrode 1 is seen in the laminating direction. The foundation layer 3 is mainly composed of copper (Cu) or silver (Ag), for example.

The resistance layer 4 is formed on the foundation layer 3 so as to cover the whole region of the foundation layer 3. Therefore, the resistance layer 4 continuously covers all the end portions of the lead portions 25, 26 exposed at the side face 10a. The resistance layer 4 has the second width $D_2$, which is wider than the first width $D_1$ but narrower than the width of the side face 10a of the multilayer body 10. More specifically, the second width $D_2$ of the resistance layer 4 is narrower than the third width $D_3$. Namely, the resistance layer 4 is wider than each of the lead portions 25, 26 of the first inner electrodes 21, 22 but narrower than the side face 10a arranged with the first terminal electrode 1, more specifically narrower than each of the capacitance forming portions 23, 24. Here, the second width $D_2$ refers to the width of the resistance layer 4 in the direction along the side face 10a of the multilayer body 10 when the first terminal electrode 1 is seen along the laminating direction of the multilayer body 10.

As shown in FIG. 4, the lead portions 25, 26 of the first inner electrodes 21, 22 are drawn such that their end portions are exposed within a first region 10c having an area smaller than that of the side face 10a in the side face 10a. The resistance layer 4 is formed on a second region 10d having an area smaller than the side face 10a but greater than the first region 10c and covering the whole area of the first region 10c. The foundation layer 3 is formed on a third region 10e having an area smaller than each of the side face 10a and second region 10d but greater than the first region 10c and covering the whole area of the first region 10c. Since each of the second and third regions 10d, 10e covers the whole area of the first region 10c, both of the resistance layer 4 formed on the second region 10d and the foundation layer 3 formed on the third region 10e cover all the end portions of the lead portions 25, 26 of the first inner electrodes 21, 22.

The resistance layer 4 has a resistivity greater than that of the first and second inner electrodes 21, 22, 31, 32. The resistivity of the resistance layer 4 is also greater than that of any of the foundation layer 3, conductor layer 5, and plating layer 6. The resistance layer 4 contains ruthenium oxide ($RuO_2$) or carbon as major components, for example.

The conductor layer 5 is formed on the resistance layer 4 so as to cover the whole region of the resistance layer 4 and the whole region of the side face 10a of the multilayer body 10. The conductor layer 5 contains copper (Cu) or silver (Ag) as major components, for example.

The plating layer 6 is formed on the conductor layer 5 so as to cover the whole region of the conductor layer 5 and the whole region of the side face 10a of the multilayer body 10. The plating layer 6 contains tin (Sn) as major components, for example.

A method of manufacturing the multilayer capacitor in accordance with this embodiment will now be explained. First, the multilayer body 10 in which a plurality of (5 in this embodiment) dielectric layers 11 to 15 and a plurality of (2 each in this embodiment) first and second inner electrodes 21, 22, 31, 32 are alternately laminated as shown in FIG. 2 is prepared. As mentioned above, the plurality of first inner electrodes 21, 22 include the capacitance forming portions 23, 24, and the lead portions 25, 26 extending from the capacitance forming portions 23, 24 so as to expose end portions at the side face 10a. As mentioned above, the second inner electrodes 31, 32 include the capacitance forming portions 33, 34, and the lead portions 35, 36 extending from the capacitance forming portions 33, 34 to the side face 10b.

An example of method of manufacturing the multilayer body 10 will now be explained with reference to FIGS. 5 and 6. The example illustrated here includes the steps of forming green unit multilayer bodies, forming a green multilayer body, removing a binder, and sintering the green multilayer body so as to yield a multilayer body. For convenience of viewing, hatchings are omitted in FIGS. 5 and 6.

The step of forming green unit multilayer bodies will be explained with reference to FIG. 5. First, a ceramic green layer 81 is formed on a PET film P1 (support). The ceramic green layer 81 is formed by adding a binder resin (e.g., organic binder resin), a solvent, a plasticizer, and the like to a dielectric material mainly composed of barium titanate, mixing and dispersing them, applying the resulting ceramic slurry onto the PET film P1, and then drying the slurry. A plurality of first electrode patterns 82a are formed on the dried ceramic green layer 81, so as to form a first green unit multilayer body 80a. A plurality of second electrode patterns 82b are formed on a dried ceramic green layer 81, so as to form a second green unit multilayer body 80b.

The first and second electrode patterns 82a, 82b are formed by printing an electrode paste onto the upper face of the ceramic green sheet 81 and then drying it The electrode paste is a pasty composition in which a binder resin, a solvent, and the like are mixed with a powder of a metal such as nickel (Ni), silver (Ag), or palladium (Pd), for example. Screen printing is used as printing means, for example.

Each first electrode pattern 82a is formed like letter H in which two oblongs are connected to each other by a smaller oblong. Each second electrode pattern 82b is formed like an oblong having substantially the same size as the outline of the H-shaped first electrode pattern 82a.

Next, the PET films P1 are peeled off from the first and second unit multilayer bodies 80a, 80b. A plurality of (2 each in this embodiment) first and second green unit multilayer bodies 80a, 80b are alternately laminated, and a ceramic green layer 81 is further laminated thereon, so as to form a green assembly 83 as shown in FIG. 6. FIG. 6 is a sectional view showing the green assembly 83 formed in the process of manufacturing the multilayer capacitor in accordance with this embodiment.

Subsequently, the green assembly 83 is cut along first cut surfaces L and second cut surfaces (not depicted) which are orthogonal to each other, so as to form a plurality of green multilayer bodies 84. The first cut surfaces L are planes parallel to the laminating direction and are constituted by those passing the midpoints of the individual first electrode patterns 82a and midpoints between a plurality of second electrode patterns 82b and those passing the midpoints of the individual second electrode patterns 82b and midpoints between a plurality of first electrode patterns 82a. The second cut surfaces are orthogonal to the first cut surfaces L and parallel to the laminating direction, and are constituted by those passing the midpoints between a plurality of first electrode patterns 82a and those passing the midpoints between a plurality of second electrode patterns 82b. End portions of the first and second inner electrode patterns 82a, 82b are exposed at the end faces of the green multilayer bodies 84 obtained by cutting the first cut surfaces L.

After the cutting, the binder included in the ceramic green layers 81 of each green multilayer body 84 is removed, and then the green multilayer body 84 is sintered, whereby the multilayer body 10 is obtained. By sintering the green multilayer body 84, the ceramic green layers 81 turn into the dielectric layers 11 to 15, whereas the first and second electrode patterns 82a, 82b turn into the first and second inner electrodes 21, 22, 31, 32. The side faces of the green multilayer body 84 obtained by cutting the first cut surfaces L correspond to the side faces 10a, 10b of the multilayer body 10.

The first inner electrodes 21, 22 of thus obtained multilayer body 10 include the capacitance forming portions 23, 24, and the lead portions 25, 26 extending from the capacitance forming portions 23, 24 so as to expose end portions at the side face 10a.

Next, the first and second terminal electrodes 1, 2 are formed on the side faces 10a, 10b of the multilayer body 10. Steps of forming the first terminal electrode 1 will be explained specifically with reference to FIGS. 7A to 7D. First, as shown in FIG. 7A, the foundation layer 3 of the first terminal electrode 1 is formed on the side face 10a of the multilayer body 10 obtained by cutting the green assembly 83 at the first cut surfaces L. The foundation layer 3 is formed by printing a foundation conductor paste in a region which continuously covers all the end portions of the lead portions 25, 26 included in the first inner electrodes 21, 22 exposed at the side face 10a while having a width wider than the first width $D_1$ but narrower than the side face 10a (more specifically narrower than the third width $D_3$). A conductor paste mainly composed of copper or silver, for example, is used as the foundation conductor paste.

Figure 7B:
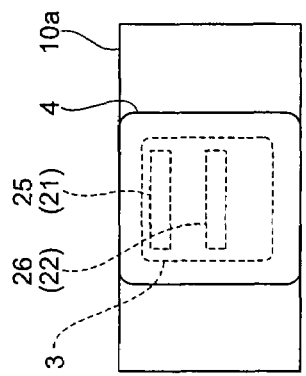
FIG. 7B is a sectional view for explaining a manufacturing step of the terminal electrode included in the multilayer capacitor in accordance with the first embodiment.
Figure 7A:
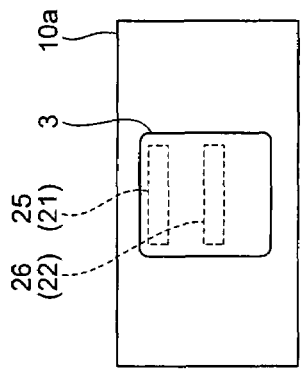
FIG. 7A is a sectional view for explaining a manufacturing step of a terminal electrode included in the multilayer capacitor in accordance with the first embodiment.

Next, as shown in FIG. 7B, a high-resistance conductor paste is printed on the foundation layer 3 in a region which covers the whole area of the foundation layer 3 while having a width wider than the first width $D_1$ but narrower than the side face 10a (more specifically narrower than the third width $D_3$), so as to form the resistance layer 4 of the first terminal electrode 1. The resistivity of the high-resistance conductor paste is greater than both of the resistivity of the first inner electrodes 21, 22 and the resistivity of the foundation conductor paste. For example, ruthenium oxide or carbon paste is used as the high-resistance conductor paste.

Figure 7C:
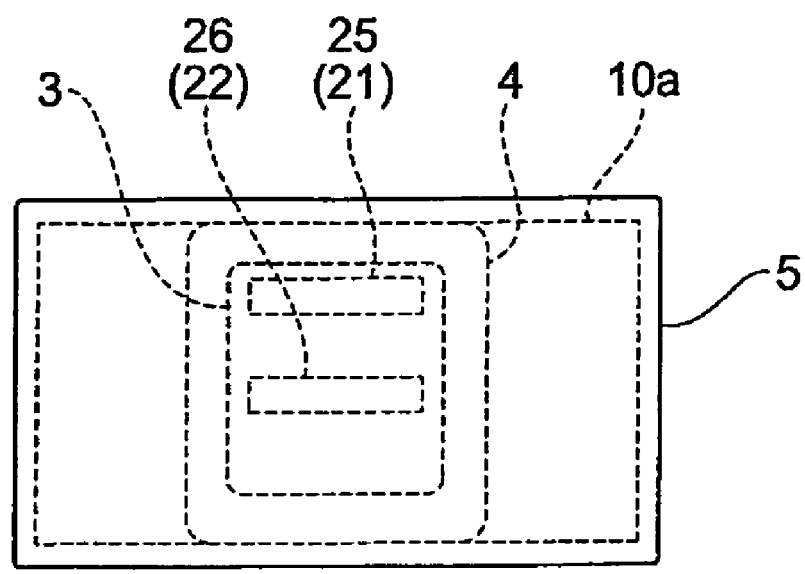
FIG. 7C is a sectional view for explaining a manufacturing step of the terminal electrode included in the multilayer capacitor in accordance with the first embodiment.

Subsequently, as shown in FIG. 7C, the conductor layer 5 is formed on the resistance layer 4 so as to cover not only the whole area of the resistance layer 4 but also the whole area of the side face 10a. The conductor layer 5 is formed by dipping (immersion) with a conductor paste mainly composed of silver or copper, for example.

Figure 7D:
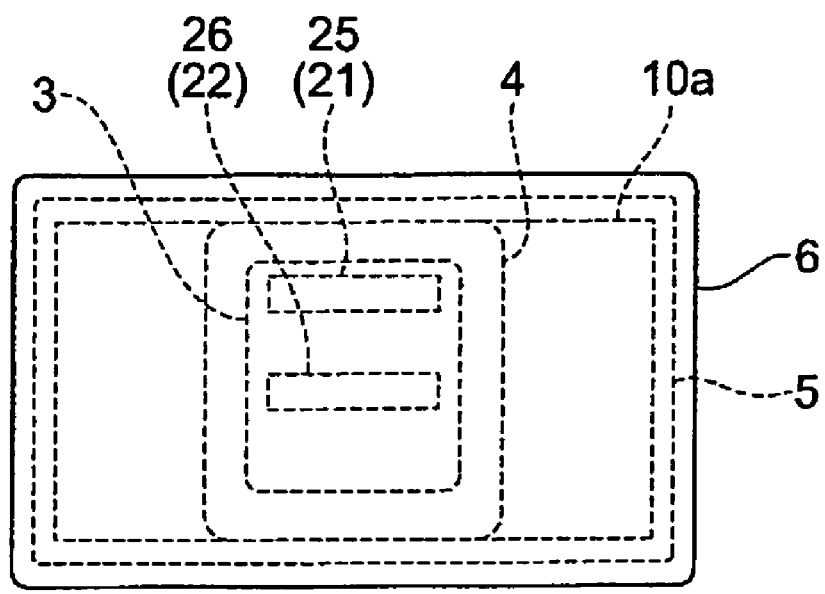
FIG. 7D is a sectional view for explaining a manufacturing step of the terminal electrode included in the multilayer capacitor in accordance with the first embodiment.

Thereafter, as shown in FIG. 7D, the plating layer 6 is formed on the conductor layer 5 by tin plating so as to cover the whole area of the conductor layer 5 and the whole area of the side face 10a.

The second terminal electrode 2 is formed on the side face 10b of the multilayer body 10 by dipping (immersion) and electroplating, for example.

The first terminal electrode 1 includes the resistance layer 4 having a resistivity greater than that of the first inner electrodes 21, 22. The width (second width) $D_2$ of the resistance layer 4 of the first terminal electrode 1 is wider than the width (first width) $D_1$ of each of the lead portions 25, 26 in the first inner electrodes, whereby the resistance layer 4 covers all the end portions of the lead portions 25, 26 included in the first inner electrodes 21, 22. Therefore, all the first inner electrodes 21, 22 are electrically connected to the resistance layer 4. As a result, the multilayer capacitor C1 can increase its equivalent series resistance.

The width (first width) $D_1$ of each of the lead portions 25, 26 in the first inner electrodes 21, 22 is narrower than the width of the side face 10a arranged with the first terminal electrode 1. Therefore, this multilayer capacitor C1 can decrease the area of the resistance layer 4 as compared with a multilayer capacitor equipped with a terminal electrode including a resistance layer formed so as to cover the whole area of the side face. As a result, the multilayer capacitor C1 can easily restrain the thickness of the resistance layer 4 from fluctuating, and can regulate the equivalent series resistance easily and accurately.

In particular, the foundation layer 3 and resistance layer 4 of the first terminal electrode are formed by printing in the manufacturing method in accordance with this embodiment. Therefore, the thickness of the resistance layer 4 can favorably be restrained from fluctuating.

Accurately regulating the equivalent series resistance improves the yield of the multilayer capacitor C1 as well.

Each of the capacitance forming portions 23, 24 included in the first inner electrodes 21, 22 has the third width $D_3$ wider than the first width $D_1$ of the lead portions 25, 26 included in the first inner electrodes 21, 22. Therefore, even when the lead portions 25, 26 connected to the resistance layer 4 are made narrower in order to regulate the equivalent series resistance more accurately, the width of the capacitance forming portions 23, 24 carrying the capacitance can be held wide. Hence, the resistance layer 4 can be narrowed while increasing the capacitance.

In the multilayer capacitor C1, the second width $D_2$, which is the width of the resistance layer 4, is narrower than the third width $D_3$, which is the width of the capacitor forming portions 23, 24. By narrowing the width of the resistance layer 4 as such, the multilayer capacitor C1 can regulate the equivalent series resistance more accurately.

The first terminal electrode 1 includes the foundation layer 3. The resistance layer 4 is formed by a material having a high resistivity, e.g., a material mainly composed of ruthenium oxide or carbon Therefore, the junction of the first inner electrodes 21, 22 and the first terminal electrode 1 becomes favorable through the foundation layer 3 mainly composed of copper or silver, for example.

The first terminal electrode 1 also includes the plating layer 6 mainly composed of tin, for example. This improves the durability of the first terminal electrode 1 and the solderablity of the first terminal electrode 1 to a substrate or the like.

The first terminal electrode 1 also includes the conductor layer 5 between the resistance layer 4 and plating layer 6. When the resistance layer 4 is mainly composed of ruthenium oxide or carbon, its junction to the plating layer 6 mainly composed of tin becomes more favorable through the conductor layer 5 mainly composed of copper or silver interposed therebetween The multilayer body 10 has a substantially rectangular parallelepiped form, whose side faces 10a, 10b respectively formed with the first and second terminal electrodes 1, 2 are side faces extending longitudinally of the multilayer body. This shortens the path of a current flowing through the first and second inner electrodes 21, 22, 31, 32, and thus can lower the equivalent series inductance of the multilayer capacitor C1.

Second Embodiment

Figure 9:
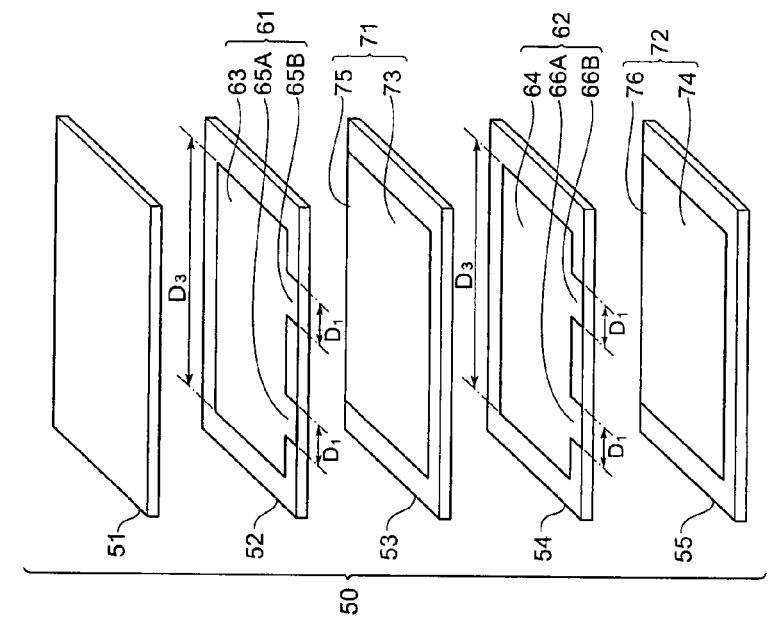
FIG. 9 is an exploded perspective view of the multilayer body included in the multilayer capacitor in accordance with the second embodiment.
Figure 8:
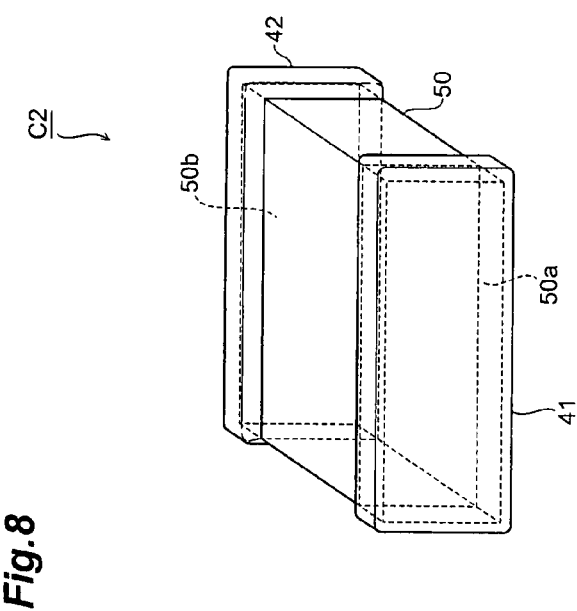
FIG. 8 is a perspective view of a multilayer capacitor in accordance with a second embodiment.
Figure 10:
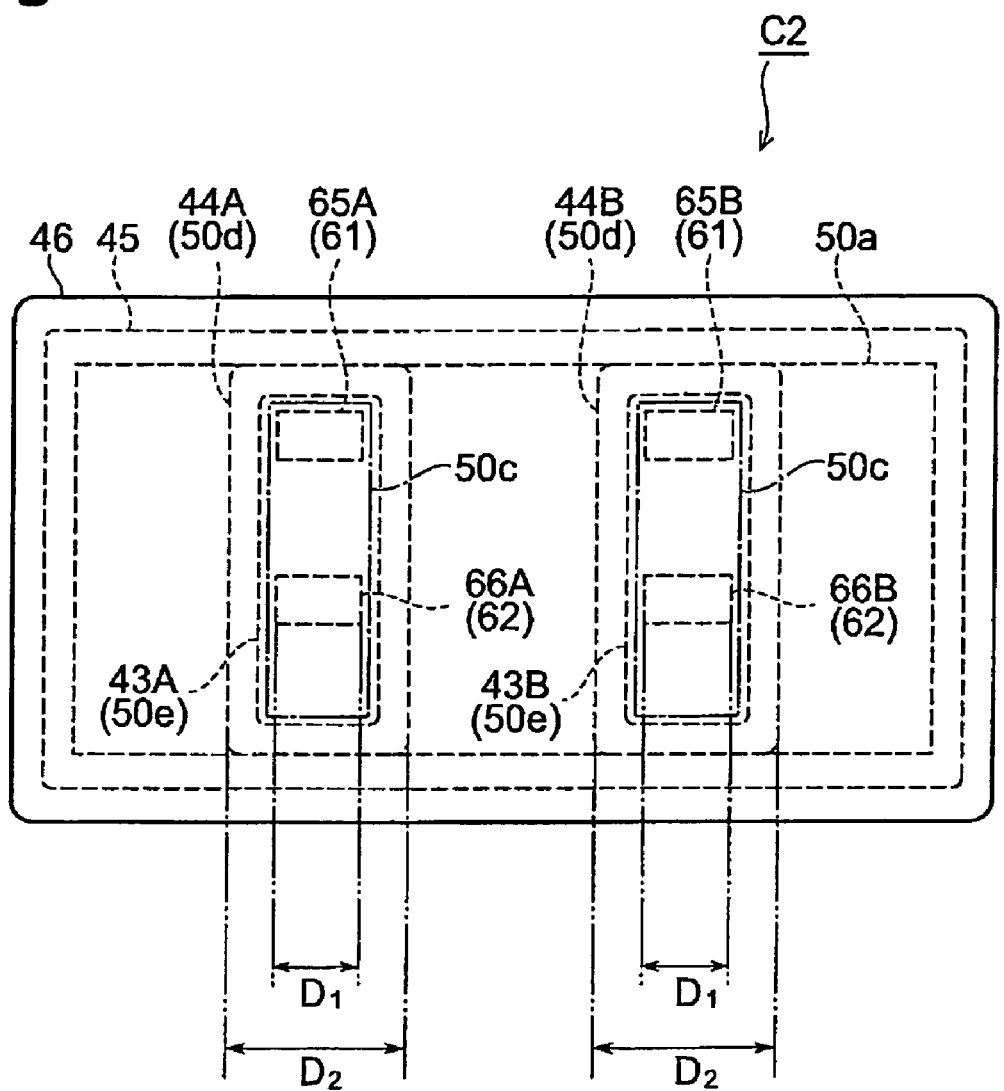
FIG. 10 is a view for explaining the structure of a terminal electrode in the multilayer capacitor in accordance with the second embodiment.

With reference to FIGS. 8 to 10, a multilayer capacitor C2 in accordance with a second embodiment will be explained. FIG. 8 is a perspective view of the multilayer capacitor in accordance with the second embodiment. FIG. 9 is an exploded perspective view of the multilayer body included in the multilayer capacitor in accordance with the second embodiment FIG. 10 is a view for explaining the structure of a terminal electrode of the multilayer capacitor in accordance with the second embodiment As shown in FIG. 8, the multilayer capacitor C2 comprises a rectangular parallelepiped multilayer body 50, and first and second terminal electrodes 41, 42 formed on the multilayer body 50.

The first terminal electrode 41 is positioned on a side face 50a extending longitudinally of the multilayer body 50. The second terminal electrode 42 is positioned on a side face 50b extending longitudinally of the multilayer body 50 and opposing the side face 50a. The first terminal electrode 41 and second terminal electrode 42 are electrically insulated from each other.

As shown in FIG. 9, the multilayer body 50 is constructed by alternately laminating a plurality of (5 in this embodiment) dielectric layers 51 to 55 and a plurality of (2 each in this embodiment) first and second inner electrodes 61, 62, 71, 72. The actual multilayer capacitor C2 is integrated to such an extent that no boundaries are discernible among the dielectric layers 51 to 55. The first and second inner electrodes 61, 62, 71, 72 are mainly composed of nickel, for example.

The first inner electrodes 61, 62 include capacitance forming portions 63, 64 corresponding to first capacitance forming portions and a plurality of (2 each in this embodiment) lead portions 65A, 65B, 66A, 66B. Each of the capacitance forming portions 63, 64 has a rectangular form. The capacitance forming portions 63, 64 are arranged at respective positions separated from side faces parallel to the laminating direction of the dielectric layers 51 to 55 in the multilayer body 50 (hereinafter simply referred to as "laminating direction") by a predetermined distance. The capacitance forming portions 63, 64 are arranged so as to be substantially overlaid on each other when seen in the laminating direction.

The lead portions 65A, 65B extend in parallel with each other from the end portion (side) of the capacitance forming portion 63 facing the side face 50a of the multilayer body 50 to the side face 50a so as to expose their end portions at the side face 50a. The lead portions 66A, 66B extend in parallel with each other from the end portion (side) of the capacitance forming portion 64 facing the side face 50a of the multilayer body 50 to the side face 50a so as to expose their end portions at the side face 50a. The lead portions 65A, 65B, 66A, 66B are connected to the first terminal electrode 41 by their end portions exposed at the side face 50a.

The plurality of lead portions 65A, 65B included in the first inner electrode 61 are arranged so as to be substantially overlaid on the plurality of lead portions 66A, 66B included in another first inner electrode 62 and form a plurality of sets of lead portions (a set of the lead portions 65A and 66A and a set of the lead portions 65B and 66B) arranged along the laminating direction. Therefore, the lead portions 65A and 66A form a set of them opposing each other with the respective dielectric layers 52, 53 in between in the laminating direction. The lead portions 65B and 66B form a set of them opposing each other with the dielectric layers 52, 53 in between in the laminating direction.

Each of the lead portions 65A, 65B, 66A, 66B of the first inner electrodes 61, 62 has a first width $D_1$. Each of the capacitance forming portions 63, 64 of the first inner electrodes 61, 62 has a third width $D_3$. Each resist layer of the first terminal electrode 41 which will be explained later has a second width $D_2$.

The first width $D_1$ refers to the width of each of the lead portions 65A, 65B, 66A, 66B in a direction along the side face 50a of the multilayer body 50 arranged with the first terminal electrode 41. The third width $D_3$ refers to the width of each of the capacitance forming portions 63, 64 in the direction along the side face 50a of the multilayer body 50 arranged with the first terminal electrode 41. The first width $D_1$ of each of the lead portions 65A, 65B, 66A, 66B is smaller than the third width $D_3$ of their corresponding capacitance forming portions 63, 64.

The second inner electrodes 71, 72 include capacitance forming portions 73, 74 corresponding to second capacitance forming portions and lead portions 75, 76. Each of the capacitance forming portions 73, 74 has a rectangular form. The capacitance forming portions 73, 74 are arranged at respective positions separated from side faces parallel to the laminating direction by a predetermined distance. The capacitance forming portions 73, 74 are arranged so as to be substantially overlaid on each other when seen in the laminating direction.

The capacitance forming portions 63, 64 of the first inner electrodes 61, 62 are arranged so as to oppose the capacitance forming portions 73, 74 of the second inner electrodes 71, 72 with the dielectric layers 52 to 54 in between in the laminating direction of the multilayer body 50.

The lead portions 75, 76 are arranged so as to extend straight from the capacitance forming portions 73, 74 to the same side face 50b of the multilayer body 50 and expose end portions at the side face 50b. The lead portions 75, 76 are connected to the second terminal electrode 42 by their end portions exposed at the side face 50b. The width of each of the lead portions 75, 76 is identical to that of each of the capacitance forming portions 73, 74.

As shown in FIG. 10, the first terminal electrode 41 includes a plurality of (2 in this embodiments) foundation layers 43A, 43B, a plurality of (2 in this embodiments) resistance layers 44A, 44B, a conductor layer 45, and a plating layer 46. FIG. 10 is a view for explaining the structure of the first terminal electrode 41 seen from the side face 50a of the multilayer body 50. The foundation layer 43A and resistance layer 44A correspond to the lead portions 65A, 66A included in the first inner electrodes 61, 62. The foundation layer 43B and resistance layer 44B correspond to the lead portions 65B, 66B included in the first inner electrodes 61, 62.

As shown in FIG. 10, the foundation layers 43A, 43B and resistance layers 44A, 44B correspond to sets of a plurality of lead portions 65A, 65B, 66A, 66B substantially overlaid on each other along the laminating direction of a plurality of first inner electrodes 61, 62 and continuously cover all the end portions of lead portions 65A, 65B, 66A, 66B included in their corresponding sets.

Namely, the foundation layer 43A and resistance layer 44A correspond to a set of lead portions 65A, 66A substantially overlaid on each other along the laminating direction of a plurality of first inner electrodes 61, 62 and continuously cover all the end portions of the lead portions 65A, 66A included in this set. The foundation layer 43B and resistance layer 44B correspond to a set of lead portions 65B, 66B substantially overlaid on each other along the laminating direction of a plurality of first inner electrodes 61, 62 and continuously cover all the end portions of the lead portions 65B, 66B included in this set.

The foundation layers 43A, 43B are mainly composed of copper or silver, for example. Each of the foundation layers 43A, 43B has a width wider than the first width $D_1$ but narrower than the width of the side face 50a of the multilayer body 50. More specifically, the width of each of the foundation layers 43A, 43B is narrower than the third width $D_3$. Namely, each of the foundation layers 43A, 43B is wider than each of the lead portions 65A, 65B, 66A, 66B of the first inner electrodes 61, 62 but narrower than the side face 50a arranged with the first terminal electrode 41, more specifically narrower than each of the capacitor forming portions 63, 64. Here, the width of the foundation layers 43A, 43B refers to the one in the direction along the side face 50a of the multilayer body 50 when the first terminal electrode 41 is seen along the laminating direction of the multilayer body 50. The width of the side face 50a refers to the one when the side face 50a arranged with the first terminal electrode 41 is seen in the laminating direction.

The resistance layer 44A is formed on the foundation layer 43A so as to cover the whole region of the foundation layer 43A. The resistance layer 44B is formed on the foundation layer 43B so as to cover the whole region of the foundation layer 43B. Each of the resistance layers 44A, 44B has the second width $D_2$, which is wider than the first width $D_1$ but narrower than the width of the side face 50a of the multilayer body 50. More specifically, the second width $D_2$ of the resistance layers 44A, 44B is narrower than the third width $D_3$. Namely, each of the resistance layers 44A, 44B is wider than each of the lead portions 65A, 65B, 66A, 66B of the first inner electrodes 61, 62 but narrower than the side face 50a arranged with the first terminal electrode 41, more specifically narrower than each of the capacitor forming portions 63, 64. Here, the second width $D_2$ refers to the width of each of the resistance layers 44A, 44B in the direction along the side face 50a of the multilayer body 50 when the first terminal electrode 41 is seen along the laminating direction of the multilayer body 50.

The sum of the widths $D_2$ of a plurality of resistance layers 44A, 44B is smaller tan the width of the side face 50a of the multilayer body 50 arranged with the first terminal electrode 41.

As shown in FIG. 10, the lead portions 65A, 65B, 66A, 66B of the first inner electrodes 61, 62 are drawn such that their end portions are exposed within a plurality of (2 in this embodiment) first regions 50c each having an area smaller than that of the side face 50a in the side face 50a. Namely, the lead portions 65A, 66A are drawn so as to expose their end portions within one first region 50c, whereas the lead portions 65B, 66B are drawn so as to expose their end portions within the other first region 50c. The resistance layers 44A, 44B are formed on a plurality of (2 in this embodiment) second regions 50d each having an area smaller than the side face 50a but greater than each first region 50c and covering the whole area of the first region 50c. The foundation layers 43A, 43B are formed on a plurality of (2 in this embodiment) third regions 50e each having an area smaller than the side face 50a and each second region 50d but greater than each first region 50c and covering the whole area of the first region 50c. Since the second and third regions 50d, 50e cover all the areas of the first regions 50c, both of the resistance layers 44A, 44B formed on the second regions 50d and the foundation layers 43A, 43B formed on the third regions 50e cover all the end portions of the lead portions 65A, 65B, 66A, 66B of the first inner electrodes 61, 62.

Each of the resistance layers 44A, 44B has a resistivity greater than that of the first and second inner electrodes 61, 62, 71, 72. The resistivity of each of the resistance layers 44A, 44B is also greater than that of any of the foundation layers 43A, 43B, conductor layer 45, and plating layer 46. The resistance layers 44A, 44B are mainly composed of ruthenium oxide ($RuO_2$) or carbon, for example.

The conductor layer 45 is formed on the plurality of resistance layers 44A, 44B so as to cover all the areas of the resistance layers 44A, 44B and the whole region of the side face 50a of the multilayer body 50. The conductor layer 45 is mainly composed of copper or silver, for example.

The plating layer 46 is formed on the conductor layer 45 so as to cover the whole region of the conductor layer 45 and the whole region of the side face 50a of the multilayer body 50. The plating layer 46 is mainly composed of tin, for example.

A method of manufacturing the multilayer capacitor in accordance with this embodiment will now be explained. First, the multilayer body 50 in which a plurality of (5 in this embodiment) dielectric layers 51 to 55 and a plurality of (2 each in this embodiment) first and second inner electrodes 61, 62, 71, 72 are alternately laminated as shown in FIG. 9 is prepared. As mentioned above, the plurality of first inner electrodes 61, 62 include the capacitance forming portions 63, 64 each having the third width $D_3$ and a plurality of lead portions 65A, 65B, 66A, 66B extending from the capacitance forming portions 63, 64 so as to expose end portions at the side face 50a while having the first width $D_1$ narrower than the third width $D_3$. As mentioned above, the second inner electrodes 71, 72 include the capacitance forming portions 73, 74, and the lead portions 75, 76 extending from the capacitance forming portions 73, 74 to the side face 50b.

The multilayer body 50 is manufactured by the same method as that of preparing the multilayer body 10 included in the multilayer capacitor C1 in accordance with the first embodiment, for example. The first and second inner electrodes 61, 62 of thus obtained multilayer body 50 include the capacitance forming portions 63, 64, and the lead portions 65A, 65B, 66A, 66B extending from the capacitance forming portions 63, 64 so as to expose end portions at the side face 50a.

Figure 11A:
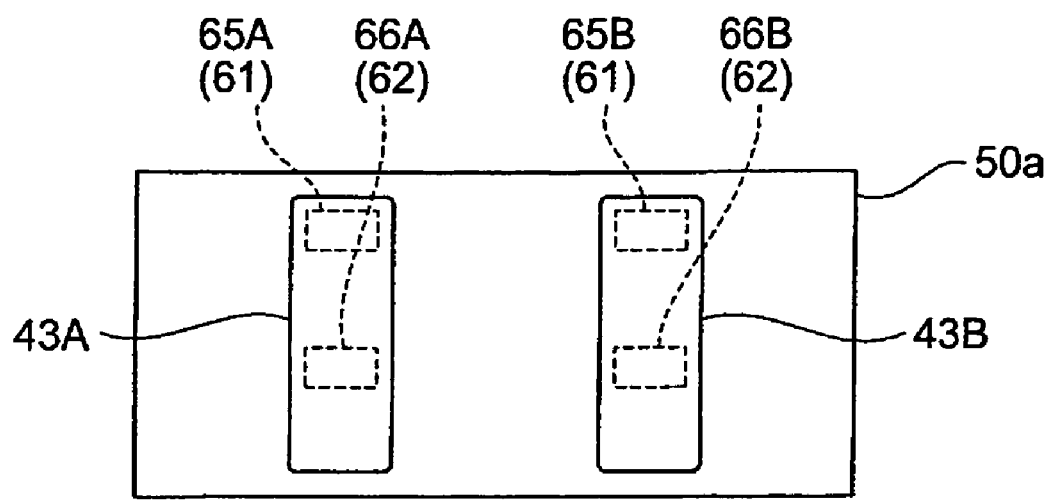
FIG. 11A is a view for explaining a manufacturing step of a terminal electrode included in the multilayer capacitor in accordance with the second embodiment.

Next, the first and second terminal electrodes 41, 42 are formed on side faces of the multilayer body 50. Steps of forming the first terminal electrode 41 will specifically be explained with reference to FIGS. 11A to 11D. First, as shown in FIG. 11A, a plurality of foundation layers 43A, 43B of the first terminal electrode 41 are formed on the side face 50a of the multilayer body 50. The foundation layer 43A corresponds to a set of lead portions 65A, 66A substantially overlaid on each other along the laminating direction of the first inner electrodes 61, 62. The foundation layer 43B corresponds to a set of lead portions 65B, 66B substantially overlaid on each other along the laminating direction of the first inner electrodes 61, 62.

Therefore, the foundation layer 43A is formed by printing a foundation conductor paste in a region continuously covering all the end portions of the lead portions 65A, 66A substantially overlaid on each other along the laminating direction. On the other hand, the foundation layer 43B is formed by printing a foundation conductor paste in a region continuously covering all the end portions of the lead portions 65B, 66B substantially overlaid on each other along the laminating direction. A conductor paste mainly composed of copper or silver, for example, is used as the foundation conductor paste.

Figure 11C:
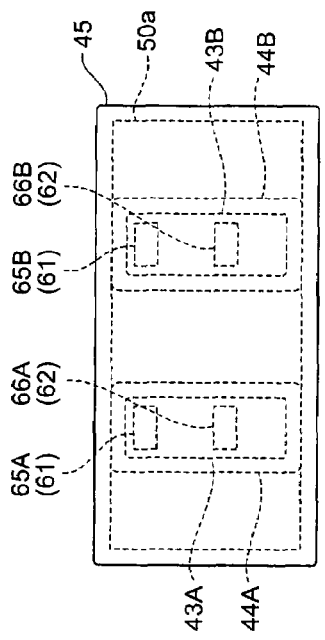
FIG. 11C is a view for explaining a manufacturing step of the terminal electrode included in the multilayer capacitor in accordance with the second embodiment.
Figure 11B:
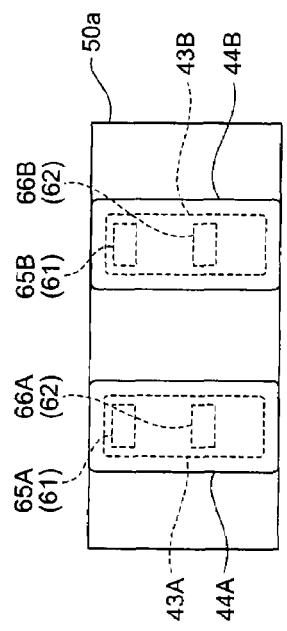
FIG. 11B is a view for explaining a manufacturing step of the terminal electrode included in the multilayer capacitor in accordance with the second embodiment.

Next, as shown in FIG. 11B, a high-resistance conductor paste is printed on the foundation layers 43A, 43B so as to cover all the areas of the foundation layers 43A, 43B, thereby forming a plurality of resistance layers 44A, 44B of the first terminal electrode 41.

Therefore, the resistance layer 44A is formed by printing a high-resistance conductor paste in a region continuously covering all the end portions of the lead portions 65A, 66A substantially overlaid on each other along the laminating direction. On the other hand, the resistance layer 44B is formed by printing a high-resistance conductor paste in a region continuously covering all the end portions of the lead portions 65B, 66B substantially overlaid on each other along the laminating direction.

The resistivity of the high-resistance conductor paste is greater than both of the resistivity of the first inner electrodes 61, 62 and the resistivity of the foundation conductor paste. For example, ruthenium oxide or carbon paste is used as the high-resistance conductor paste.

Subsequently, as shown in FIG. 11C, the conductor layer 45 is formed on the resistance layers 44A, 44B so as to cover not only all the areas of the resistance layers 44A, 44B but also the whole area of the side face 50a. The conductor layer 45 is formed by dipping (immersion) with a conductor paste mainly composed of silver or copper, for example.

Figure 11D:
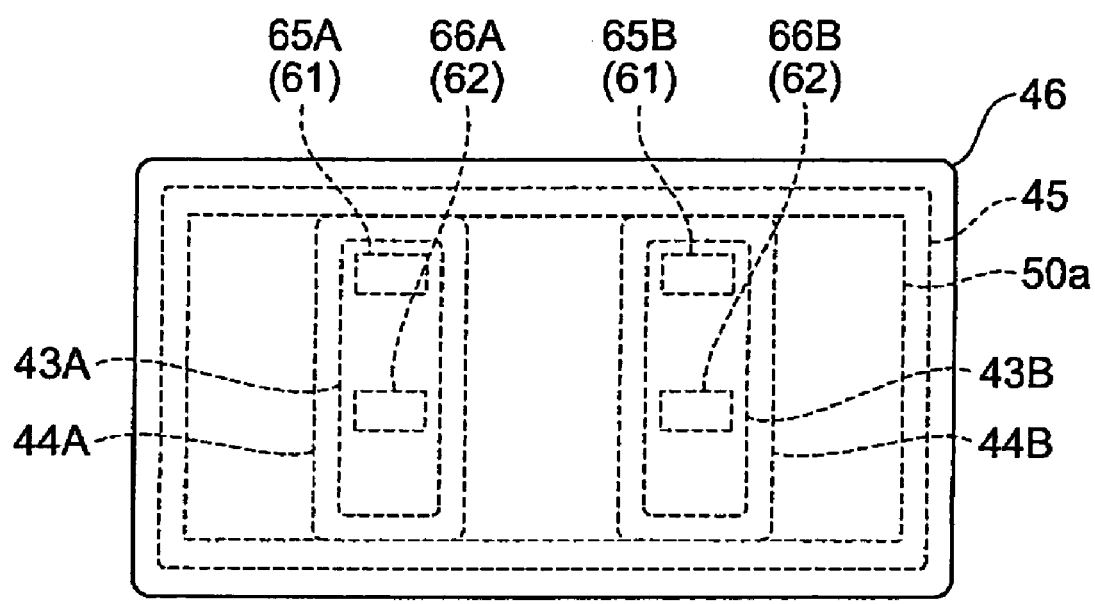
FIG. 11D is a view for explaining a manufacturing step of the terminal electrode included in the multilayer capacitor in accordance with the second embodiment.

Thereafter, as shown in FIG. 11D, the plating layer 46 is formed on the conductor layer 45 by tin plating so as to cover the whole area of the conductor layer 45 and the whole area of the side face 50a.

The second terminal electrode 42 is formed on the side face 50b of the multilayer body 50 by dipping (immersion) and electroplating, for example.

The first terminal electrode 41 includes the resistance layers 44A, 44B having a resistivity greater than that of the first inner electrodes 61, 62. The width (second width) $D_2$ of each of the resistance layers 44A, 44B in the first terminal electrode 41 is wider than the width (first width) $D_1$ of each of the lead portions 65A, 66A in the first inner electrodes 61, 62, whereby the resistance layers 44A, 44B cover all the end portions of their corresponding lead portions 65A, 65B, 66A, 66B included in the first inner electrodes 61, 62. Therefore, all the first inner electrodes 61, 62 are electrically connected to the resistance layers 44A, 44B. As a result, the multilayer capacitor C2 can increase its equivalent series resistance.

The width (first width) $D_1$ of each of the lead portions 65A, 65B, 66A, 66B in the first inner electrodes 61, 62 is narrower than the width (third width) $D_3$ of each of the capacitor forming portions 63, 64 in the first inner electrodes 61, 62. Therefore, when forming resistance layers of terminal electrode so as to cover all the end portions of lead portions, this multilayer capacitor C2 can decrease the area of each of the resistance layers 44A, 44B as compared with a multilayer capacitor whose capacitance forming portions and lead portions have the same width. As a result, the multilayer capacitor C2 can easily restrain the thickness of each of the resistance layers 44A, 44B from fluctuating, and can regulate the equivalent series resistance easily and accurately.

The width (first width) $D_1$ of each of the lead portions 65A, 65B, 66A, 66B in the first inner electrodes 61, 62 is narrower than the width of the side face 50a arranged with the first terminal electrode 41. Therefore, this multilayer capacitor C2 can decrease the area of each of the resistance layers 44A, 44B as compared with a multilayer capacitor equipped with a terminal electrode including a resistance layer formed so as to cover the whole area of the side face. As a result, the multilayer capacitor C2 can easily restrain the thickness of each of the resistance layers 44A, 44B from fluctuating, and can regulate the equivalent series resistance easily and accurately.

The sum of the widths $D_2$ of a plurality of (2 in this embodiment) resistance layers 44A, 44B is smaller than the width of the side face 50a of the multilayer body 50 arranged with the first terminal electrode 41. This makes it possible to suppress fluctuations in thickness of the resistance layers 44A, 44B and regulate the equivalent series resistance easily and accurately as compared with a multilayer capacitor equipped with a terminal electrode including a resistance layer formed so as to cover the whole area of the side face.

In particular, the foundation layers 43A, 43B and resistance layers 44A, 44B of the first terminal electrode 41 are formed by printing in the manufacturing method in accordance with this embodiment Therefore, the thickness of the resistance layers 44A, 44B can favorably be restrained from fluctuating.

Accurately regulating the equivalent series resistance improves the yield of the multilayer capacitor C2 as well.

The first inner electrodes 61, 62 include a plurality of lead portions 65A, 65B, 66A, 66B. In conformity with the fact that the first inner electrodes 61, 62 include a plurality of lead portions 65A, 65B, 66A, 66B, the first terminal electrode 41 includes a plurality of resistance layers 44A, 44B. Namely, it includes the resistance layer 44A corresponding to the lead portions 65A, 66A, and the resistance layer 44B corresponding to the lead portions 65B, 66B. Therefore, the respective resistance components of the resistance layers 44A, 44B are connected in parallel in the first terminal electrode 41, which makes it possible to restrain fluctuations from affecting a desirable resistance layer thickness.

Each of the capacitance forming portions 63, 64 included in the first inner electrodes 61, 62 has the third width $D_3$ wider than the first width $D_1$ of the lead portions 65A, 65B, 66A, 66B included in the first inner electrodes 61, 62. Therefore, even when the lead portions 65A, 65B, 66A, 66B connected to the resistance layers 44A, 44B are made narrower in order to regulate the equivalent series resistance more accurately, the width of the capacitance forming portions 63, 64 carrying the capacitance can be held wide. Hence, the resistance layers 44A, 44B can be narrowed while increasing the capacitance.

In the multilayer capacitor C2, the second width $D_2$, which is the width of the resistance layers 44A, 44B, is narrower than the third width $D_3$, which is the width of the capacitor forming portions 63, 64. By narrowing the width of the resistance layers 44A, 44B as such, the multilayer capacitor C2 can regulate the equivalent series resistance more accurately.

Since the first terminal electrode 41 includes the foundation layers 43A, 43B mainly composed of copper or silver, for example, the junction between the resistance layers 44A, 44B mainly composed of ruthenium oxide or carbon, for example, and the first inner electrodes 61, 62 becomes favorable.

The first terminal electrode 41 also includes the plating layer 46 mainly composed of tin, for example. This improves the durability of the first terminal electrode 41 and the solderablity of the first terminal electrode 41 to a substrate or the like.

The first terminal electrode 41 also includes the conductor layer 45 between the resistance layers 44A, 44B and plating layer 46. When the resistance layers 44A, 44B are mainly composed of ruthenium oxide or carbon, their junction to the plating layer 46 mainly composed of tin becomes more favorable through the conductor layer 45 mainly composed of copper or silver interposed therebetween.

The side faces 50a, 50b respectively formed with the first and second terminal electrodes 41, 42 are side faces extending longitudinally of the multilayer body 50. This shortens the path of a current flowing through the first and second inner electrodes 61, 62, 71, 72, and thus can lower the equivalent series inductance of the multilayer capacitor C2.

Though preferred embodiments of the present invention are explained in detail in the foregoing, the present invention is not limited to the above-mentioned embodiments. For example, the number of laminated dielectric layers 11 to 15, 51 to 55 and the number of laminated first and second inner electrodes 21, 22, 31, 32 are not limited to those stated in the above-mentioned embodiments. The number of lead portions included in each of the first and second inner electrodes 21, 22, 31, 32 may be 3 or more, for example, without being limited to the numbers stated in the above-mentioned embodiments.

Though the above-mentioned embodiments regulate the equivalent series resistance of each multilayer capacitor in the first terminal electrode, the second terminal electrode may also include a resistance layer, and both of the first and second terminal electrodes may regulate the equivalent series resistance. The side faces formed with the first and second terminal electrodes are not limited to the longitudinal side faces of a multilayer body. The terminal electrode may omit one or two or all of the foundation layer, conductor layer, and plating layer. The terminal electrode may include layers other than the foundation layer, conductor layer, resistance layer, and plating layer as. well.

The method of preparing a multilayer body is not limited to the methods described in the above-mentioned embodiments.

From the invention thus described, it will be obvious that the invention may be varied in many ways Such variations are not to be regarded as a departure from the spirit and scope of the invention, and all such modifications as would be obvious to one skilled in the art are intended for inclusion within the scope of the following claims.

What is claimed is:

1. A multilayer capacitor comprising a multilayer body in which a plurality of dielectric layers and a plurality of inner electrodes are laminated alternately, and first and second terminal electrodes arranged on a side face of the multilayer body;

wherein the plurality of inner electrodes include a plurality of first and second inner electrodes laminated alternately;

wherein each of the first inner electrodes includes a first capacitance forming portion, and a lead portion extending from the first capacitance forming portion so as to expose an end portion at the side face arranged with the first terminal electrode and electrically connect with the first terminal electrode and having a first width;

wherein each of the second inner electrodes includes a second capacitance forming portion opposing the first capacitance forming portion with a dielectric layer in between in a laminating direction, and a lead portion extending from the second capacitance forming portion so as to expose an end portion at the side face arranged with the second terminal electrode and electrically connect with the second terminal electrode;

wherein the first terminal electrode includes a resistance layer having a resistivity greater than that of the first inner electrode;

wherein the resistance layer has a second width narrower than the width of the side face arranged with the first terminal electrode but wider than the first width and continuously covers all the end portions of the lead portions exposed at the side face of the multilayer body;

wherein the first capacitance forming portion included in each first inner electrode has a third width wider than the first width of the lead portion included in the first inner electrode;

wherein the second width is narrower than the third width; and wherein a difference between the second width and the first width is smaller than a difference between the second width and the width of the side face arranged with the first terminal electrode.

2. A multilayer capacitor according to claim 1, wherein the first capacitance forming portion included in each first inner electrode has a third width wider than the first width of the lead portion included in the first inner electrode.

3. A multilayer capacitor according to claim 2, wherein the second width is narrower than the third width.

4. A multilayer capacitor according to claim 1, wherein the first terminal electrode further includes a foundation layer arranged on the side face exposing the end portions of the lead portions of the first inner electrodes and under the resistance layer, a conductor layer arranged on the resistance layer, and a plating layer arranged on the conductor layer;

wherein the foundation layer has a width narrower than the second width and continuously covers all the end portions of the lead portions continuously covered with the resistance layer arranged on the foundation layer;

wherein the resistance layer is arranged so as to cover the whole area of the foundation layer; and wherein each of the resistivity of the foundation layer and resistivity of the plating layer is smaller than the resistivity of the resistance layer.

5. A multilayer capacitor according to claim 1, wherein the multilayer body has a substantially rectangular parallelepiped form; and wherein each of the side face arranged with the first terminal electrode and the side face arranged with the second terminal electrode is a side face extending longitudinally of the multilayer body.

6. A multilayer capacitor comprising a multilayer body in which a plurality of dielectric layers and a plurality of inner electrodes are laminated alternately, and first and second terminal electrodes arranged on a side face of the multilayer body;

wherein the plurality of inner electrodes include a plurality of first and second inner electrodes laminated alternately;

wherein each of the first inner electrodes includes a first capacitance forming portion, and a plurality of lead portions each having a first width;

wherein each of the lead portions included in each of the first inner electrodes extends from the first capacitance forming portion so as to expose an end portion at the side face arranged with the first terminal electrode and electrically connect with the first terminal electrode;

wherein the plurality of lead portions included in each of the first inner electrodes are arranged so as to substantially overlap with the plurality of lead portions included in another first inner electrode in a laminating direction and form a plurality of sets of lead portions along the laminating direction;

wherein each of the second inner electrodes includes a second capacitance forming portion opposing the first capacitance forming portion with a dielectric layer in between in the laminating direction, and a lead portion extending from the second capacitance forming portion to the side face arranged with the second terminal electrode and electrically connecting with the second terminal electrode;

wherein the first terminal electrode includes a plurality of resistance layers having a resistivity greater than that of the first inner electrode;

wherein the sum of widths of the plurality of resistance layers is smaller than the width of the side face arranged with the first terminal electrode; and wherein each of the resistance layers has a second width wider than the first width, corresponds to the sets of the lead portions of the plurality of first inner electrodes along the laminating direction, and continuously covers all the end portions of the lead portions included in each of the sets.

7. A multilayer capacitor according to claim 6, wherein the first capacitance forming portion included in each first inner electrode has a third width wider than the first width of the lead portion included in said first inner electrode.

8. A multilayer capacitor according to claim 7, wherein the second width is narrower than the third width.

9. A multilayer capacitor according to claim 6, wherein the first terminal electrode further includes a foundation layer arranged on the side face exposing the end portions of the lead portions of the first inner electrodes and under the resistance layer, a conductor layer arranged on the resistance layer, and a plating layer arranged on the conductor layer;

wherein the foundation layer has a width narrower than the second width and continuously covers all the end portions of the lead portions continuously covered with the resistance layer arranged on said foundation layer;

wherein the resistance layer is arranged so as to cover the whole area of the foundation layer; and wherein each of the resistivity of the foundation layer and resistivity of the plating layer is smaller than the resistivity of the resistance layer.

10. A multilayer capacitor according to claim 6, wherein the multilayer body has a substantially rectangular parallelepiped form; and wherein each of the side face arranged with the first terminal electrode and the side face arranged with the second terminal electrode is a side face extending longitudinally of the multilayer body.

11. A multilayer capacitor according to claim 6, wherein the first capacitance forming portion included in each first inner electrode has a third width wider than the first width of the lead portion included in said first inner electrode;

wherein the second width is narrower than the third width;

wherein a product value obtained by multiplying a difference between the second width and the first width by a number of the plurality of resistance layers is smaller than a product value obtained by multiplying a difference between the second width and the width of the side face arranged with the first terminal electrode by the number of the plurality of resistance layers;

wherein a product value obtained by multiplying a difference between the second width and the first width by a number of the plurality of resistance layers is smaller than a difference between a product value obtained by multiplying the second width by the number of the plurality of resistance layers and the width of the side face arranged with the first terminal electrode.

12. A method of manufacturing a multilayer capacitor, the method comprising the steps of:

preparing a multilayer body in which a plurality of first inner electrodes each including a first capacitance forming portion and a lead portion extending from the first capacitance forming portion so as to expose an end portion at a side face and a plurality of second inner electrodes each including a second capacitance forming portion and a lead portion extending from the second capacitance forming portion to a side face are alternately laminated with a dielectric layer interposed therebetween;

printing a foundation conductor paste in a region continuously covering all the end portions of the lead portions included in the plurality of first inner electrodes on a side face exposing the end portions of the lead portions, so as to form a foundation layer of a first terminal electrode having a width wider than the end portion of each of the lead portions of the first inner electrodes but narrower than the side face arranged with the first terminal electrode;

and printing a high-resistance conductor paste having a resistivity greater than that of the first inner electrode and that of the foundation conductor paste on the foundation layer of the first terminal electrode so as to cover the whole area of the foundation layer and form a resistance layer of the first terminal electrode having a width wider than the end portion of each of the lead portions of the first inner electrodes but narrower than the side face arranged with the first terminal electrode, wherein the width of the first capacitance forming portion included in each first inner electrode is wider than the width of the lead portion included in the first inner electrode;

wherein the width of the resistance layer of the first terminal electrode is narrower than the width of the first capacitance forming portion; and wherein a difference between the width of the resistance layer of the first terminal electrode and the width of the lead portion included in the first inner electrode is smaller than a difference between the width of the resistance layer and the width of the side face arranged with the first terminal electrode.

* * * * *